United States Patent
Vergnat et al.

(10) Patent No.: US 7,206,177 B2
(45) Date of Patent: Apr. 17, 2007

(54) DEVICE AND METHOD FOR PROTECTION AGAINST OVERCURRENTS IN AN ELECTRICAL ENERGY DISTRIBUTION CABINET

(75) Inventors: Sébastien Vergnat, Toulouse (FR); Etienne Foch, Toulouse (FR)

(73) Assignee: Airbus France, Toulouse Cedex (FR)

( * ) Notice: Subject to any disclaimer, the term of this patent is extended or adjusted under 35 U.S.C. 154(b) by 367 days.

(21) Appl. No.: 10/626,254

(22) Filed: Jul. 23, 2003

(65) Prior Publication Data

US 2005/0099746 A1   May 12, 2005

(30) Foreign Application Priority Data

Jul. 24, 2002  (FR) ................... 02 09379

(51) Int. Cl.
*H02H 3/00*   (2006.01)

(52) U.S. Cl. ........................... 361/87

(58) Field of Classification Search .......... 361/44, 361/45, 87

See application file for complete search history.

(56) References Cited

U.S. PATENT DOCUMENTS

| | | | | |
|---|---|---|---|---|
| 3,273,018 A * | 9/1966 | Goldberg | ............ | 361/58 |
| 4,054,857 A * | 10/1977 | Bowling | ............ | 337/129 |
| 4,631,622 A * | 12/1986 | Howell | ............ | 361/45 |
| 4,862,308 A | 8/1989 | Udren | ............ | 361/45 |
| 5,303,156 A * | 4/1994 | Matsuoka et al. | ............ | 701/43 |
| 5,809,045 A | 9/1998 | Adamiak et al. | ............ | 371/48 |
| 5,818,673 A * | 10/1998 | Matsumaru et al. | ............ | 361/63 |
| 6,282,499 B1 * | 8/2001 | Andersen | ............ | 702/64 |
| 6,525,918 B1 * | 2/2003 | Alles et al. | ............ | 361/93.1 |
| 6,757,146 B2 * | 6/2004 | Benmouyal et al. | ............ | 361/93.6 |

* cited by examiner

*Primary Examiner*—Brian Sircus
*Assistant Examiner*—Scott Bauer
(74) *Attorney, Agent, or Firm*—Thelen Reid Brown Raysman & Steiner LLP

(57) ABSTRACT

The invention relates to a device for protection against overcurrents in an electrical energy distribution cabinet which receives electrical energy supplied by at least one generator and which distributes this energy to at least two loads, which comprises:

switching means (20),
   means (23; C) for calculating the absolute value of the difference between at least one current entering the said cabinet and at least one corresponding current leaving the said cabinet, for at least one harmonic of these currents,
   comparison means (24) which control the opening of the switching means (20) if this absolute value is greater than a predetermined threshold (S).

16 Claims, 4 Drawing Sheets

DEVICE AND METHOD FOR PROTECTION AGAINST OVERCURRENTS IN AN ELECTRICAL ENERGY DISTRIBUTION CABINET

CROSS-REFERENCE TO RELATED APPLICATION

This application claims priority to French application no. 02 09379, filed on Jul. 24, 2002, entitled: "Device and Method for Protection Against Overcurrents in an Electrical Energy Distribution Cabinet" and was not published in English.

TECHNICAL FIELD OF THE INVENTION

The present invention relates to a device and a method for protection against overcurrents in an electrical energy distribution cabinet, particularly in the electric core of an aircraft which permits the distribution of electrical energy supplied by one or more sources, for example, generators driven by the engines of this aircraft, to a plurality of loads, particularly such as transformers, motors, etc.

STATE OF THE PRIOR ART

An electrical energy distribution cabinet should be dimensioned and protected so as not to be damaged by overcurrents which can affect its operation.

Such overcurrents can in particular result from a short circuit, for example to ground, located within the said distribution cabinet.

In an exemplary embodiment shown in FIG. 1, such an electrical energy distribution cabinet 10 receives input of electrical energy supplied by two generators $G_1$ and $G_2$. It distributes this energy to loads $L_1$ to $L_N$ by means of distribution lines and bars within this cabinet. In a conventional manner, contactors $K_1$ and $K_2$, controlled according to protection rules for the entering currents $I_1$ and $I_2$, permit the said entering currents coming from these respective generators $G_1$ and $G_2$ to be limited. These protection rules, for example, may be, but are not necessarily, similar to the response of thermal circuit breakers.

Contactors or circuit breakers $K_{L1} \ldots K_{LN}$ permit the output currents $I_{L1} \ldots I_{LN}$ distributed to the loads $L_1 \ldots L_N$ to be limited.

Optionally, one or more contactors $K_J$ permit the distribution of the different loads supplied by the generators $G_1$ and $G_2$ to be dynamically modified.

For example, if considering a short circuit located in a branch of the said cabinet 10 supplied by the generator $G_1$, between the said contactor $K_1$ and the said circuit breakers $K_{L1}, K_{L2} \ldots K_{Li}$, the current $I_1$ is then at least equal to the short circuit current characterizing this generator $G_1$. The contactor $K_1$ is dimensioned to permit passage of a maximum current $I_1$ at least equal to the sum of the maximum values of the currents $I_{L1}, I_{L2} \ldots I_{Li}$ of the different loads $L_1, L_2 \ldots L_i$ supplied by this generator $G_1$.

If this maximum value of $I_1$ is for example equal to 500 A, the characteristics of a protection rule corresponding for example to a conventional circuit breaker, are such that the tripping of $K_1$ only takes place for a clearly greater current, for example equal to 2000 A. Consequently, the links and the distribution bars located between the contactor $K_1$ on the one hand, and the circuit breakers $K_{L1}, K_{L2} \ldots K_{Li}$ on the other hand, should be dimensioned to permit such a current of 2000 A to pass.

Several disadvantages result from such dimensioning: in particular, there is an excess cost relating to elements dimensioned for a maximum value of $I_1$, and an increase of weight which may prove to be penalizing, particularly in the case of a distribution cabinet aboard an aircraft.

The present invention has the object of remedying such disadvantages.

SUMMARY OF THE INVENTION

The present invention relates to a device for protection against overcurrents in an electrical energy distribution cabinet which receives electrical energy supplied by at least one generator and which distributes this energy to at least two loads, characterized in that it comprises:
  switching means,
  means for calculating the absolute value of the difference between at least one current entering the said cabinet and at least one corresponding current leaving the said cabinet, for at least one harmonic of these currents,
  comparison means which control the opening of switching means if this absolute value is greater than a predetermined threshold.

In a first embodiment, the said device comprises:
  means for measuring each of the different currents entering and leaving the said cabinet,
  first calculation means for at least one harmonic of each of the said currents.

In a first alternative, the second calculation means determine the difference between the current entering the cabinet from a generator and the sum of the currents leaving this cabinet corresponding to the loads supplied by this generator, for at least one harmonic of these currents.

In a second alternative, the second calculating means determine the difference between all the currents entering the cabinet and all the currents leaving the cabinet, for at least one harmonic of these currents.

The measurement of the value of the currents, as well as the different calculations, can be performed cyclically, with a given sampling frequency. This sampling frequency is advantageously greater by a factor of 10 than the fundamental frequency of a current supplied by a generator. The control of the switching means can only be tripped if a short circuit condition is verified during a number of sampling periods greater than a threshold value.

The current measurements may be performed on each of the phases of the electrical connections.

The switching means advantageously comprise at least one contactor.

The first calculating means may effect a calculation on the fundamental harmonic of each of the currents, or on the sum of the fundamental harmonic and several lowest-order harmonics of each of the currents, or on one or more harmonics of selected order from among the lowest orders of each of the currents.

In a second embodiment, the device of the invention comprises acquisition modules in which the current is measured, and at least one digital communication bus for information transmission between these modules and these calculating means.

Each digital communication bus may be a CAN bus. The acquisition modules can be situated close to electrical connections.

Advantageously, an acquisition module comprises in succession a low-pass filter, a sample-and-hold circuit, a quantizing module, and a discrete Fourrier transform module.

Advantageously, in the calculating means, the absolute value of the difference between the entering and leaving current(s) is filtered over time.

The device of the invention can advantageously be used in the "electric core" of an aircraft.

The invention likewise relates to a method of protection against overcurrents in an electrical energy distribution cabinet which receives electrical energy supplied by at least one generator and which distributes this energy to at least two loads ($L_i$), characterized in that it comprises the following steps:

a step of calculation of the absolute value of the difference between at least one current entering the said cabinet and at least one corresponding current leaving the said cabinet, for at least one harmonic of these currents, a step of comparison of this absolute value with a predetermined threshold and of control of switching means if this absolute value is greater than this threshold.

In an embodiment, the said method may furthermore comprise:

a step of measuring each of the different currents entering and leaving the said cabinet, a step of calculating at least one harmonic of each of the said currents, a possible switching step.

In the calculation step, the difference may be determined between the current coming from a generator and entering the cabinet, and the sum of the currents leaving this cabinet corresponding to loads supplied by this generator, for at least one harmonic of these currents.

In the calculation step, the difference may be determined between the set of currents entering the cabinet and the set of currents leaving the cabinet, for at least one harmonic of these currents.

The measurement of the value of the currents as well as the different calculations may be performed cyclically, with a given sampling frequency.

DETAILED DESCRIPTION OF EMBODIMENTS

Figure 1:
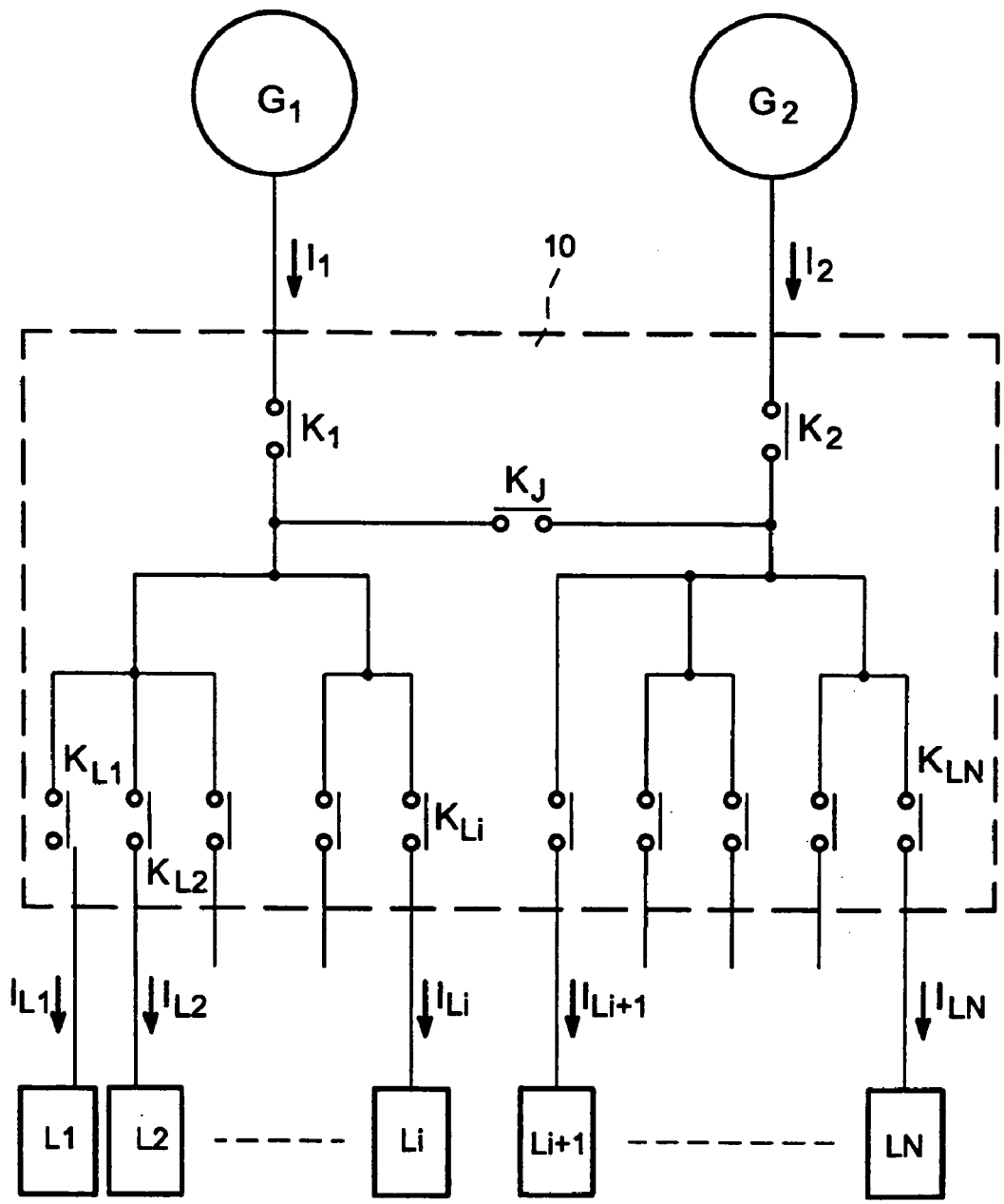
FIG. 1 shows an electrical energy distribution cabinet of the known art.
Figure 2:
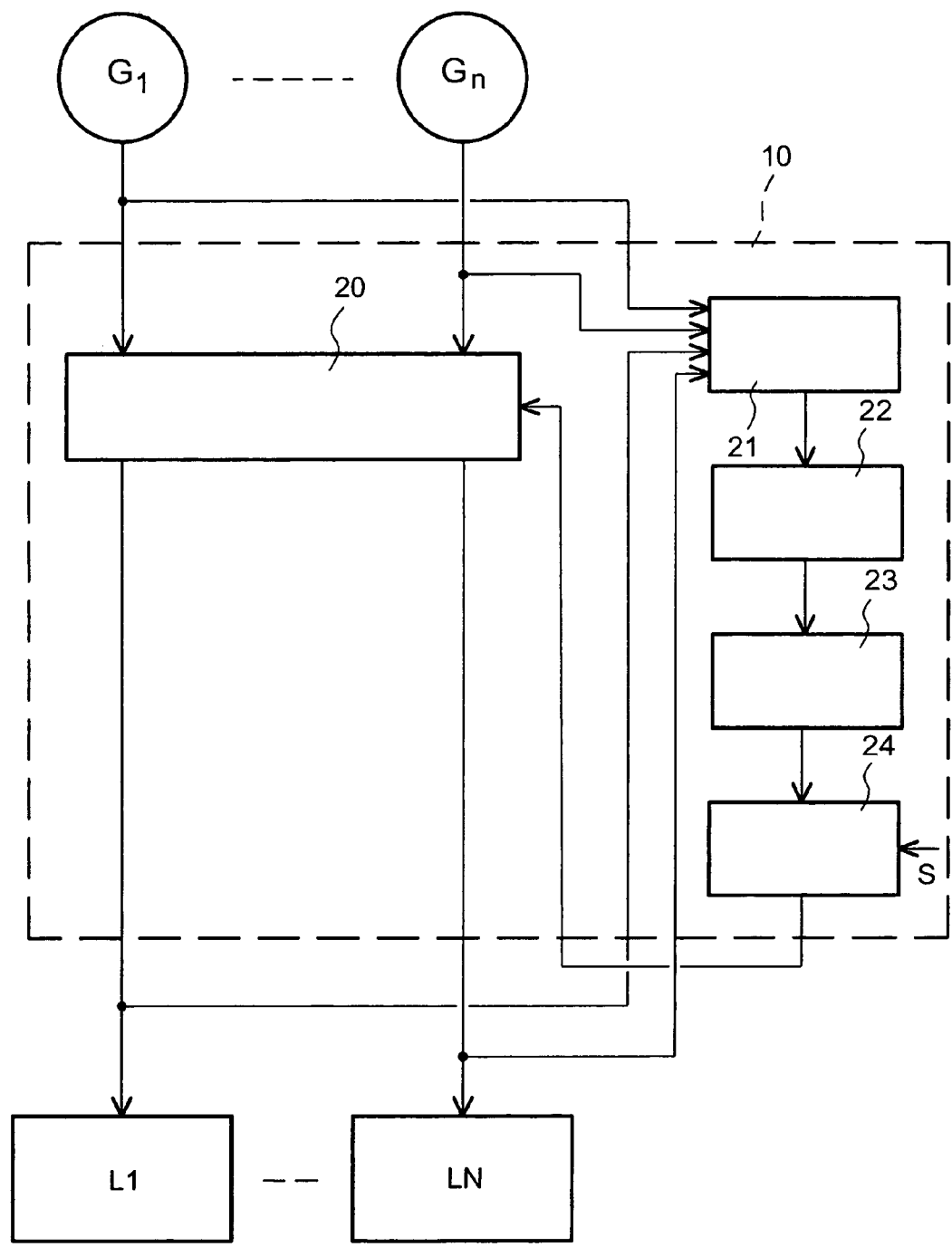
FIG. 2 shows a first embodiment of the device for protection against overcurrents in an electrical energy distribution cabinet, according to the invention.

As shown in FIG. 2, a first embodiment of the device for protection against overcurrents in an electrical energy distribution cabinet, according to the invention, which receives electrical energy 10 supplied by at least one generator $G_i$, for example the generators $G_1$ and $G_2$ of FIG. 1, and which distributes this energy to at least two loads $L_i$, for example the loads $L_1$ to $L_i$ of FIG. 1, comprises:

switching means 20, for example, at least one contactor $K_i$, means 21 for measuring each of the different currents entering and leaving the said cabinet 10, for example, the currents $I_1$, $I_2$, $I_{L1}$ to $I_{LN}$, shown in FIG. 1, first calculation means 22 for at least one harmonic of each of the said currents, taking into account both amplitude and phase, second calculation means 23 for the absolute value of the difference between at least one entering current and at least one corresponding leaving current, taking account of both amplitude and phase, for at least one harmonic of these currents, for example the difference $|I_{1j}-(I_{L1j}+I_{L2j}+\ldots)|$ for the harmonic of order j.

means 24 for comparison of this absolute value with a predetermined threshold S permitting the implementation of the control of opening the switching means.

The first calculation means 22 may thus perform a Fourier transform (FFT), for example by means of a microcontroller or a DSP (digital signal processor).

In the remainder of the description, the device of the invention is put into use in the context of the example illustrated in FIG. 1.

Thus the opening of the contactor $K_1$ is controlled so as to take place when the current $I_1$ is greater by a predetermined margin than the sum of the currents $I_{L1}$–$I_{Li}$, corresponding to the different loads supplied by the generator $G_1$.

In fact, according to Kirchhoff's first law, in the absence of a short circuit within the cabinet 10, the current $I_1$ entering should be equal to the sum of the currents leaving.

The fact that $I_1$ is greater by a predetermined margin than the sum of the currents $I_{L1}$, $I_{L2}$, ... $I_{Li}$ thus represents the presence of a short circuit, for example to ground or between phases, within the said cabinet 10.

The generator $G_1$ supplying an alternating current, the frequency of which may be fixed or variable, the said sum of the said currents has to be calculated considering both the amplitude and phase of the latter. Such a summation may necessitate considerable calculating power, still greater when the said currents include high-order harmonics. This necessary calculating power may prove to be greater than that permitted by the usual means of microcontrollers, DSP, etc.

It must be remarked that Kirchhoff's first law applies to each harmonic of the said currents. Thus for the harmonic of order j, in the absence of a short circuit, the current $I_j$ has to be equal to the sum of the currents $I_{L1j}$, $I_{L2j}$, ... $I_{Lij}$.

In the case where a short circuit is produced within the cabinet 10, the short circuit current generally includes a fundamental component representing a power greater than the power associated with high-order harmonics. Consequently, the invention consists in calculating the said difference of the said currents for one harmonic, for example the fundamental harmonic or several harmonics such as the fundamental harmonic and several lowest-order harmonics, or only several harmonics of order selected from among the lowest orders.

If the absolute value of the difference, calculated by the second calculating means 23, is greater than a predetermined threshold S, it is considered that there is a short circuit within the said electrical cabinet 10 and the opening of the switching means 20, here the contactor $K_1$, is controlled.

This calculation concerns, in a first alternative, the difference between the current coming from a generator, for example $G_1$, and entering the said cabinet 10, and the sum of the currents leaving the said cabinet, corresponding to the loads supplied by this generator, as indicated above: $|I_{1j}-(I_{L1j}+I_{L2j}\ldots+I_{Lij})|$.

In a second alternative, the absolute value can also be calculated of the difference between the set of currents entering and the set of currents leaving the cabinet, i.e.: $|I_{1j}+I_{2j}-(I_{L1j}+I_{L2j}+\ldots+I_{LNj})|$.

In this case, if the absolute value of this difference is greater than a predetermined threshold, it is considered that there is a short circuit within the said electrical cabinet 10, and control of the switching means 20 is tripped: here the contacts $K_1$ and $K_2$ are opened.

In practice, the acquisition of the values of the currents, as well as these different calculations, may be performed cyclically, according to a sampling frequency sufficiently greater than the minimum frequency imposed by Shannon's theorem as a function of the fundamental frequency of the current supplied by the generator considered.

The said sampling frequency may preferably be chosen to be greater by a factor of about 10 than the frequency of the said fundamental, say about 10 kHz for a fundamental whose order of magnitude is substantially near 1 kHz. Thus, by means of the invention, the said acquisition of measurements has the advantage of being performed at a sufficiently low sampling frequency (10 kHz) to permit its implementation with existing means (microcontrollers, etc.).

The command to open the switching means can then only be triggered if the short circuit condition resulting from the above-stated calculations is verified during a number of consecutive sampling periods greater than a predetermined threshold value (corresponding, for example, to a period of 50 to 100 ms).

The device according to the invention permits the detection both of short circuits to ground and short circuits between phases, as the current measurements may be performed distinctly on each of the phases.

Figure 3:
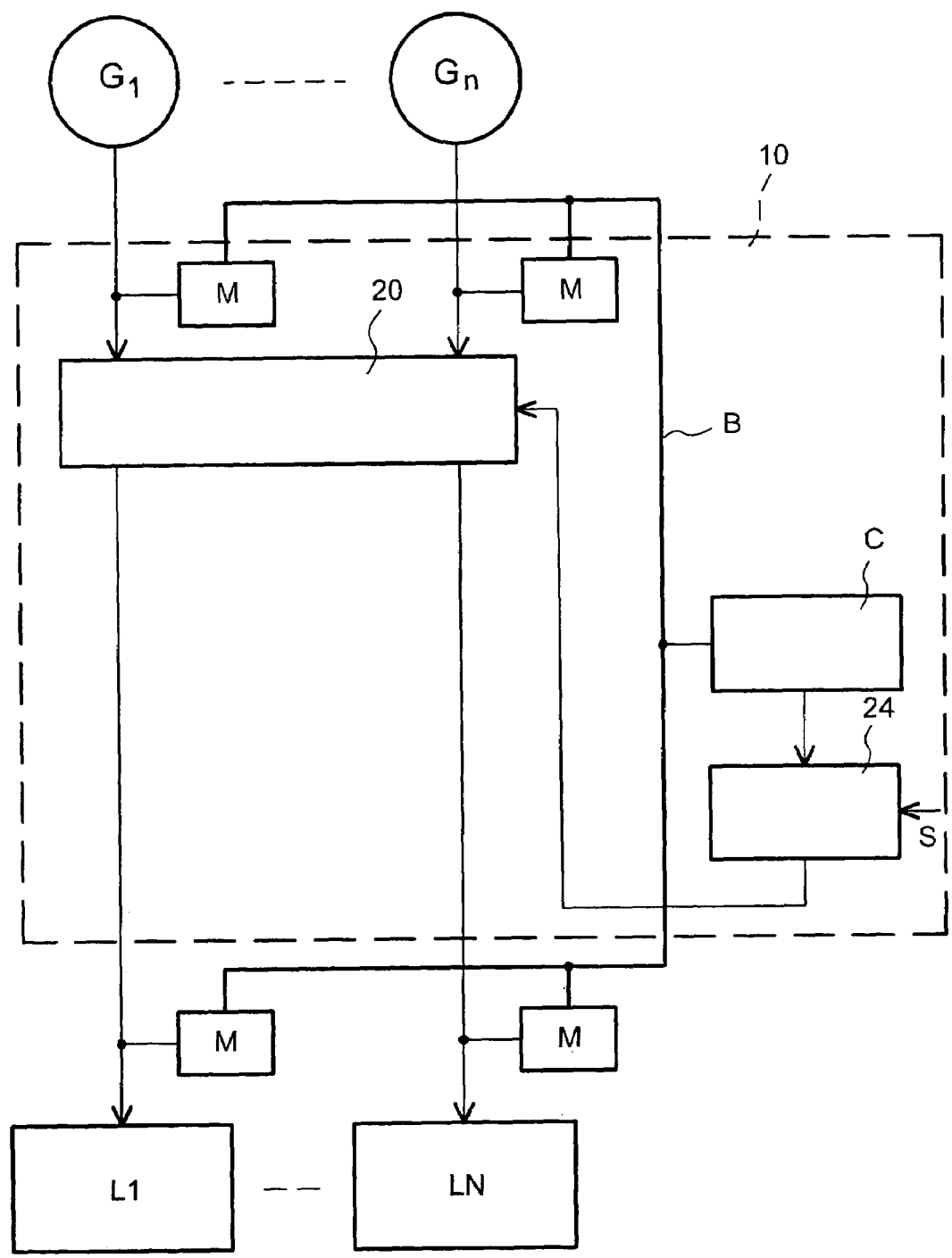
FIG. 3 shows a second embodiment of the device of the invention.

FIG. 3 illustrates a second embodiment of the device of the invention, in which the said device includes acquisition modules M, in which the current, at least one digital communication bus B and calculating means C, are measured.

The digital communication bus B may be a CAN bus. The acquisition modules M may be situated near the electrical connections.

This second embodiment permits a reduction of the cabling and consequently a reduction in weight and bulk, which is very advantageous particularly when the electrical cabinet is aboard an aircraft.

The device according to the invention is particularly suited for such a use of a digital communication bus B for the transmission of information relating to measurements of current. In fact, in the case of transmission by bus, the measurements are digitized at the level of each acquisition module M, their acquisition taking place according to the determined sampling frequency.

The relative measurements at the different acquisition modules M are generally not synchronous. A calculation made by the calculation means C using the instantaneous measurements coming from the said different modules M would thus be erroneous.

In this second embodiment, the use of the following calculations is particularly advantageous.

Each acquisition module M performs the acquisition of a current measurement, then processes the current measurement so as to determine the first harmonic(s) of the signal.

Figure 4:
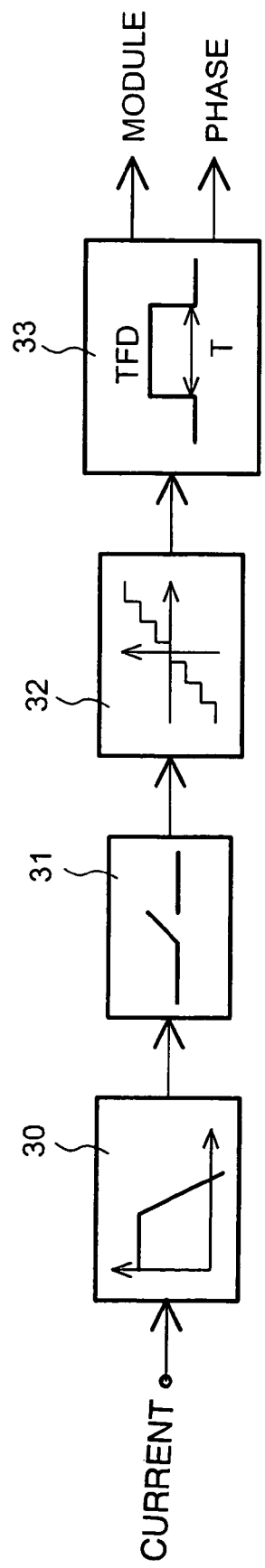
FIG. 4 shows an embodiment of an acquisition module of the second embodiment of the device of the invention shown in FIG. 3.

As shown in FIG. 4, the measured signal can then be filtered by means of a low-pass filter 30 provided to allow the said first harmonics whose acquisition is desired to pass. This low-pass filter 30 permits an anti-aliasing function of the signal spectrum to be ensured.

The output signal of this low-pass filter 30 is sampled in a sample-and-hold circuit 31, then digitized in a quantizing module 32; a discrete Fourrier transform (DFT) module 33 applies a DFT transformation to the thus digitized signal in order to determine the said first harmonics.

The fact of using only a restricted number of harmonics permits a relatively low frequency signal (of the order of a few kilohertz) to be acquired, which has the advantage of requiring, for implementation of each acquisition module M, only the use of a processor (microcontroller, DSP or digital signal processor, etc.) whose calculating power is sufficiently moderate to permit the use of a processor type which is easily available commercially.

The values corresponding to the said harmonics are transmitted by each acquisition module M to the calculating means C via at least one digital communication bus B. These calculating means C calculate the absolute value of the difference between the entering current(s) and the leaving current(s) in the same manner as the calculating means 23 in the first embodiment of the invention.

This absolute value of the difference between the entering current(s) and the leaving current(s) may be filtered temporally in order to take into account the transmission delays of information on the digital communication bus B. These delays can indeed sometimes be considerable, for example of the order of 10 ms between two consecutive transmissions of information by the same module M (corresponding to the refreshing of the said information, the period of the first order harmonic being 1 ms, for example), and can result in a momentary increase in the absolute value of the said difference when the current varies in one of the loads connected to the electrical cabinet considered.

Thus in the case of a current increase in a load, if a module M1 associated with this load transmits its information on the bus at an instant $t_1$, while a module M2 corresponding to the measurement of an entering current transmits its information at an instant $t_2=t_1+\Delta t$, the calculation means C will have measurements taking into account the said current increase starting from the instant $t_1$ for the current in the load and starting from the instant $t_2$ for the said current entering the electrical cabinet. Consequently, during the period $\Delta t$ between the said instants $t_1$ and $t_2$, the said absolute value of the difference of the currents undergoes an increase without this corresponding to a fault in the electrical cabinet.

The aforesaid temporal filtering of the current difference permits freedom from such a phenomenon.

The time constant of this filtering can be adapted to the frequency of refreshing the information by the acquisition modules M on the communication bus B.

In an advantageous embodiment of the calculating means C, if one of the acquisition modules M detects a breakdown concerning it (sensor fault, etc.), or if the said calculation means C detect a breakdown concerning this acquisition module M (communication problem, etc.), these calculation means consider that they can no longer calculate the said difference of the currents and consequently inhibit their function of control of switching means.

It should be explained that the frequency of the different currents entering and/or leaving the electrical cabinet may be variable. The frequencies of the said first harmonics may thus themselves also be variable.

The invention claimed is:

1. Device for protection against overcurrents in an electrical energy distribution cabinet, which receives electrical energy supplied by at least one generator and which distributes this energy to at least two loads, said device comprising:
   switching means,
   means for calculating the absolute value of the difference between at least one current entering said cabinet and the sum of currents leaving said cabinet corresponding to loads supplied by said generator, for at least one harmonic of these currents, comparison means which control the opening of the switching means if this absolute value is greater than a predetermined threshold acquisition modules wherein the current is measured, and at least one digital communication bus (B) for the transmission of information between these modules (M) and the calculating means, wherein each digital communication bus is a CAN bus.

2. Device according to claim 1, furthermore comprising:

means for measuring each of the different currents entering and leaving the said cabinet, first calculating means for at least one harmonic of each of the said currents.

3. Device according to claim 2, wherein the calculating means determine the difference between the current coming from a generator and entering the cabinet and the sum of the currents leaving this cabinet corresponding to the loads supplied by this generator, for at least one harmonic of these currents.

4. Device according to claim 2, wherein the second calculating means determine the difference between the set of currents entering the cabinet (10) and the set of currents leaving the cabinet (10), for at least one harmonic of these currents.

5. Device according to claim 2, wherein the measurement of the value of the currents as well as the different calculations are performed cyclically, with a given sampling frequency.

6. Device according to claim 5, wherein the sampling frequency is greater by a factor of 10 than the frequency of the fundamental of the current supplied by a generator.

7. Device according to claim 5, wherein the control of the switching means is only tripped if a short circuit condition is verified during a number of sampling periods greater than a threshold.

8. Device according to claim 2, wherein the current measurements are performed on each of the phases.

9. Device according to claim 2, wherein the switching means comprise at least one contactor.

10. Device according to claim 2, wherein the calculating means perform a calculation on the fundamental harmonic of each of the currents.

11. Device according to claim 2, wherein the calculating means perform a calculation on the sum of the fundamental harmonic and of several lowest-order harmonics of each of the currents.

12. Device according to claim 2, wherein the first calculating means perform a calculation on one or more harmonics of selected order chosen from among the lowest orders of each of the currents.

13. Device according to claim 1, wherein the acquisition modules are situated near the electrical connections.

14. Use of the device according to claim 1 in the "electrical core" of an aircraft.

15. Device for protection against overcurrents in an electrical energy distribution cabinet, which receives electrical energy supplied by at least one generator and which distributes this energy to at least two loads, said device comprising:

switching means, means for calculating the absolute value of the difference between at least one current entering said cabinet and the sum of currents leaving said cabinet corresponding to loads supplied by said generator, for at least one harmonic of these currents, comparison means which control the opening of the switching means if this absolute value is greater than a predetermined threshold acquisition modules wherein the current is measured, and at least one digital communication bus (B) for the transmission of information between these modules (M) and the calculating means, wherein an acquisition module (M) comprises in succession a low-pass filter, a sample-and-hold circuit, a quantising module, and a discrete Fourier transform module.

16. Device for protection against overcurrents in an electrical energy distribution cabinet, which receives electrical energy supplied by at least one generator and which distributes this energy to at least two loads, said device comprising:

switching means, means for calculating the absolute value of the difference between at least one current entering said cabinet and the sum of currents leaving said cabinet corresponding to loads supplied by said generator, for at least one harmonic of these currents, comparison means which control the opening of the switching means if this absolute value is greater than a predetermined threshold acquisition modules wherein the current is measured, and at least one digital communication bus (B) for the transmission of information between these modules (M) and the calculating means, wherein in the calculating means, the absolute value of the difference between the entering current(s) and the leaving current(s) is temporally filtered.

* * * * *